(12) United States Patent
Ishikawa et al.

(10) Patent No.: US 8,337,678 B2
(45) Date of Patent: Dec. 25, 2012

(54) ELECTROCHEMICAL APPARATUS

(75) Inventors: Hiroyuki Ishikawa, Utsunomiya (JP);
 Masanori Okabe, Nerima-ku (JP); Koji Nakazawa, Utsunomiya (JP); Eiji Haryu, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 12/712,711

(22) Filed: Feb. 25, 2010

(65) Prior Publication Data

US 2010/0213051 A1 Aug. 26, 2010

(30) Foreign Application Priority Data

Feb. 26, 2009 (JP) .................... 2009-044374

(51) Int. Cl.
 *C25B 9/00* (2006.01)
 *C25B 1/02* (2006.01)
 *C25B 1/04* (2006.01)
(52) U.S. Cl. ......... 204/252; 204/266; 204/278; 205/628
(58) Field of Classification Search .......... 204/252–256, 204/267, 268; 205/628–632; 429/463, 469, 429/507–511, 460
 See application file for complete search history.

(56) References Cited

U.S. PATENT DOCUMENTS

| 4,210,511 A * | 7/1980 | Campbell et al. ............ 204/256 |
| 6,338,783 B1 * | 1/2002 | Inoue et al. .................. 204/425 |
| 2006/0254907 A1 * | 11/2006 | Taruya et al. ................. 204/266 |

FOREIGN PATENT DOCUMENTS

| JP | 2004-2914 | 1/2004 |
| JP | 2004-115860 | 4/2004 |
| JP | 2005-216733 | 8/2005 |
| JP | 2005216733 A * | 8/2005 |

OTHER PUBLICATIONS

Chinese Office Action for Application No. 201010116993.0, dated Apr. 26, 2011.

* cited by examiner

*Primary Examiner* — Jonathan Johnson
*Assistant Examiner* — Ciel Thomas
(74) *Attorney, Agent, or Firm* — Nelson Mullins Riley & Scarborough LLP; Anthony A. Laurentano

(57) ABSTRACT

A hydrogen electrolysis apparatus includes a stack of unit cells each having a membrane electrode assembly sandwiched between an anode separator and a cathode separator. The anode separator has a first flow field which is supplied with water, and the cathode separator has a second flow field which produces high-pressure hydrogen through an electrolysis of the water. The cathode separator also has a first seal groove defined therein which extends around the second flow field and a first seal member inserted in the first seal groove. The first seal groove and the second flow field are held in fluid communication with each other through passageways. The passageways keep the first seal groove and the second flow field in direct fluid communication with each other in bypassing relation to the boundary between the cathode separator and a solid polymer electrolyte membrane.

5 Claims, 7 Drawing Sheets

ELECTROCHEMICAL APPARATUS

CROSS-REFERENCE TO RELATED APPLICATION

This application is based upon and claims the benefit of priority from Patent Application No. 2009-044374 filed on Feb. 26, 2009, in the Japan Patent Office, of which the contents are incorporated herein by reference.

BACKGROUND OF THE INVENTION

1. Field of the Invention

The present invention relates to an electrochemical apparatus comprising an electrolyte membrane, a pair of current collectors disposed respectively on the opposite sides of the electrolyte membrane, and a pair of separators stacked respectively on the current collectors, wherein a first flow field for supplying a first fluid is defined between one of the current collectors and one of the separators and a second flow field for producing a second fluid under a pressure higher than normal pressure through an electrolysis of the first fluid is defined between the other current collector and the other separator.

2. Description of the Related Art

Solid polymer electrolyte fuel cells generate DC electric energy when anodes thereof are supplied with a fuel gas, i.e., a gas mainly containing hydrogen, e.g., a hydrogen gas, and cathodes thereof are supplied with an oxygen-containing gas, e.g., air.

Generally, water electrolysis apparatus (electrochemical apparatus) are used to generate a hydrogen gas for use as a fuel gas for such solid polymer electrolyte fuel cells. The water electrolysis apparatus employ a solid polymer electrolyte membrane for decomposing water to generate hydrogen (and oxygen). Electrode catalyst layers are disposed on the respective sides of the solid polymer electrolyte membrane, making up a membrane electrode assembly. Current collectors are disposed on the respective sides of the membrane electrode assembly, making up a unit. The unit is essentially similar in structure to the fuel cells described above.

A plurality of such units are stacked, and a voltage is applied across the stack while water is supplied to the current collectors on the anode side. On the anodes of the membrane electrode assemblies, the water is decomposed to produce hydrogen ions (protons). The hydrogen ions move through the solid polymer electrolyte membranes to the cathodes, where the hydrogen ions combine with electrons to generate hydrogen. On the anodes, oxygen generated together with hydrogen is discharged with excess water from the units.

Such a water electrolysis apparatus generates hydrogen under a high pressure of several tens MPa. There is known a hydrogen supply apparatus as disclosed in Japanese Laid-Open Patent Publication No. 2004-002914, for example. As shown in FIG. 7 of the accompanying drawings, the disclosed hydrogen supply apparatus includes a number of unit cells each comprising an assembly which has an anode current collector 2, a cathode current collector 3, and an electrode assembly membrane 1 disposed between the collectors 2 and 3, and a pair of bipolar plates 4 sandwiching the assembly therebetween.

A flow field 5a for supplying water therethrough is defined between one of the bipolar plates 4 and the anode current collector 2, and a flow field 5b for passing generated hydrogen therethrough is defined between the other bipolar plate 4 and the cathode current collector 3. Each of the bipolar plates 4 has first seal grooves 7a, 7b defined in a peripheral edge portion thereof and accommodating first O-rings 6a respectively therein and second seal grooves 7c, 7d defined in a peripheral edge portion thereof and accommodating second O-rings 6b respectively therein.

According to Japanese Laid-Open Patent Publication No. 2004-002914, the flow field 5b serves as a high-pressure hydrogen generating chamber for generating high-pressure hydrogen. The second seal groove 7d, which is held in fluid communication with the flow field 5b, is filled with the high-pressure hydrogen, developing a high pressure therein. When the interior of the hydrogen supply apparatus is depressurized, i.e., is released from the pressure to shut down the hydrogen supply apparatus, for example, the flow field 5b is accordingly depressurized, causing the high-pressure hydrogen to flow fast from the second seal groove 7d through the gap between the electrode assembly membrane 1 and the bipolar plate 4 into the flow field 5b. Since the high-pressure hydrogen flows fast along the electrode assembly membrane 1, the electrode assembly membrane 1 is liable to be damaged.

SUMMARY OF THE INVENTION

It is an object of the present invention to provide an electrochemical apparatus which is capable of appropriately depressurizing a seal groove that is held in fluid communication with a second flow field when the second flow field is depressurized from a high-pressure level, thereby preventing an electrolyte membrane from being damaged as far as possible.

According to the present invention, there is provided an electrochemical apparatus including an electrolyte membrane, a pair of current collectors disposed respectively on opposite sides of the electrolyte membrane, and a pair of separators stacked respectively on the current collectors. A first flow field for supplying a first fluid is defined between one of the current collectors and one of the separators, and a second flow field for producing a second fluid under a pressure higher than normal pressure through an electrolysis of the first fluid is defined between the other current collector and the other separator.

According to an aspect of the present invention, the other separator includes a seal groove defined therein which extends around the second flow field, a seal member disposed in the seal groove, and an opening defined therein which provides fluid communication between the second flow field and the seal groove.

When the high-pressure second fluid is generated in the second flow field, a high pressure is developed in the second flow field, and also a high pressure is developed in the seal groove which is held in fluid communication with the second flow field. When the second flow field is released from the pressure, i.e., depressurized, the seal groove is also released from the pressure through the opening which provides direct fluid communication between the seal groove and the second flow field. Therefore, when the second flow field is released from the pressure, no pressure difference is developed between the second flow field and the seal groove, thus preventing the high-pressure fluid from moving abruptly from the seal groove into the second flow field under unwanted increased pressure differences.

According to another aspect of the present invention, the separators each have a high-pressure fluid passage held in fluid communication with the second flow field and extending therethrough along a direction in which the separators are stacked. The separators each include a seal groove defined therein which extends around the high-pressure fluid passage, a seal member disposed in the seal groove, and an opening defined therein which provides fluid communication between the high-pressure fluid passage and the seal groove.

A high pressure is developed in the seal groove which is held in fluid communication with the high-pressure fluid passage. When the high-pressure fluid passage is released from the pressure, the seal groove is also released from the pressure through the opening which provides direct fluid communication between the seal groove and the high-pressure fluid passage. Therefore, when the high-pressure fluid passage is released from the pressure, no pressure difference is developed between the high-pressure fluid passage and the seal groove, thus preventing the high-pressure fluid from moving abruptly from the seal groove into the high-pressure fluid passage under unwanted pressure differences.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
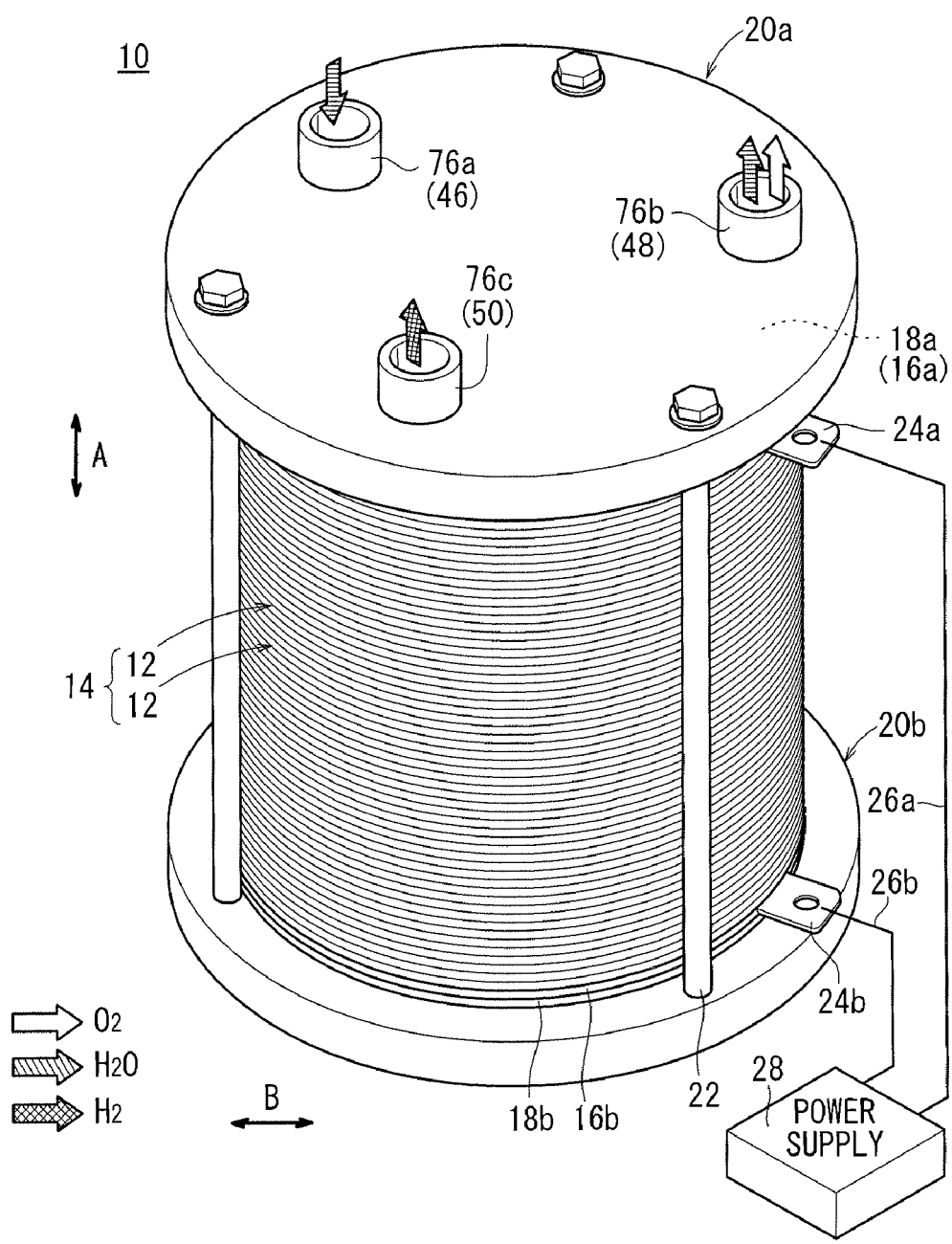
FIG. 1 is a perspective view of a water electrolysis apparatus as an electrochemical apparatus according to a first embodiment of the present invention.
Figure 2:
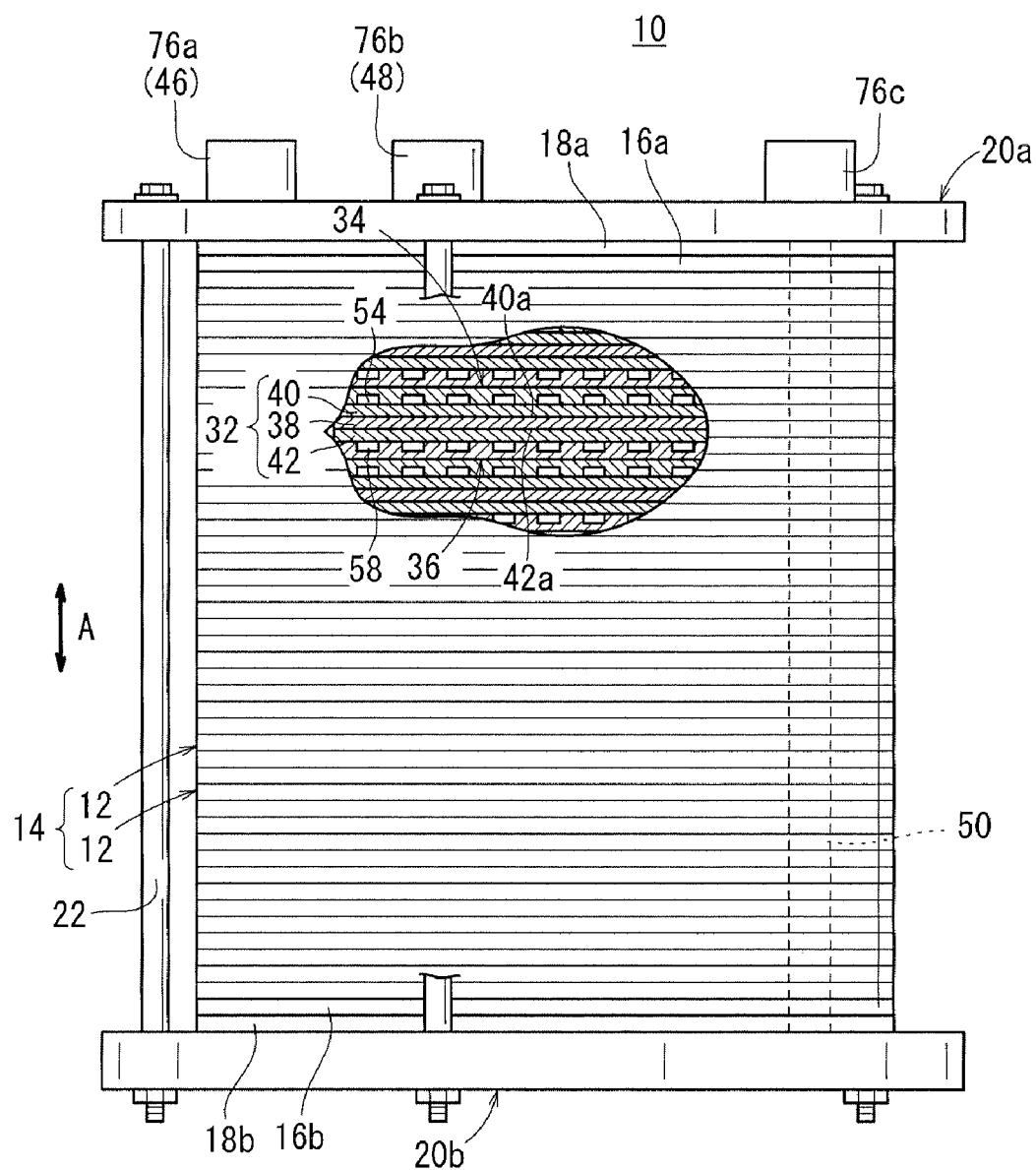
FIG. 2 is a side elevational view, partly in cross section, of the water electrolysis apparatus shown in FIG. 1.

As shown in FIGS. 1 and 2, a water electrolysis apparatus 10 (an electrochemical apparatus) according to a first embodiment of the present invention serves as a high-pressure hydrogen manufacturing apparatus, and includes a stack assembly 14 comprising a plurality of unit cells 12 stacked in a vertical direction indicated by the arrow A. The unit cells 12 may be stacked in a horizontal direction indicated by the arrow B. The water electrolysis apparatus 10 also includes a terminal plate 16a, an insulating plate 18a, and an end plate 20a which are mounted on an upper end of the stack assembly 14 upwardly in the order named, and a terminal plate 16b, an insulating plate 18b, and an end plate 20b which are mounted on a lower end of the stack assembly 14 downwardly in the order named. The unit cells 12, the terminal plates 16a, 16b, the insulating plates 18a, 18b, and the end plates 20a, 20b are of a disk shape.

The stack assembly 14, the terminal plates 16a, 16b, and the insulating plates 18a, 18b are fastened integrally together by the end plates 20a, 20b that are interconnected by a plurality of tie rods 22 extending in the directions indicated by the arrow A between the end plates 20a, 20b. Alternatively, the stack assembly 14, the terminal plates 16a, 16b, and the insulating plates 18a, 18b may be integrally held together in a box-like casing, not shown, which includes the end plates 20a, 20b as end walls. The water electrolysis apparatus 10 is illustrated as being of a substantially cylindrical shape. However, the water electrolysis apparatus 10 may be of any of various other shapes such as a cubic shape.

As shown in FIG. 1, terminals 24a, 24b project radially outwardly from respective side edges of the terminal plates 16a, 16b. The terminals 24a, 24b are electrically connected to a power supply 28 by electric wires 26a, 26b, respectively. The terminal 24a, which is an anode terminal, is connected to the positive terminal of the power supply 28, and the terminal 24b, which is a cathode terminal, is connected to the negative terminal of the power supply 28.

Figure 3:
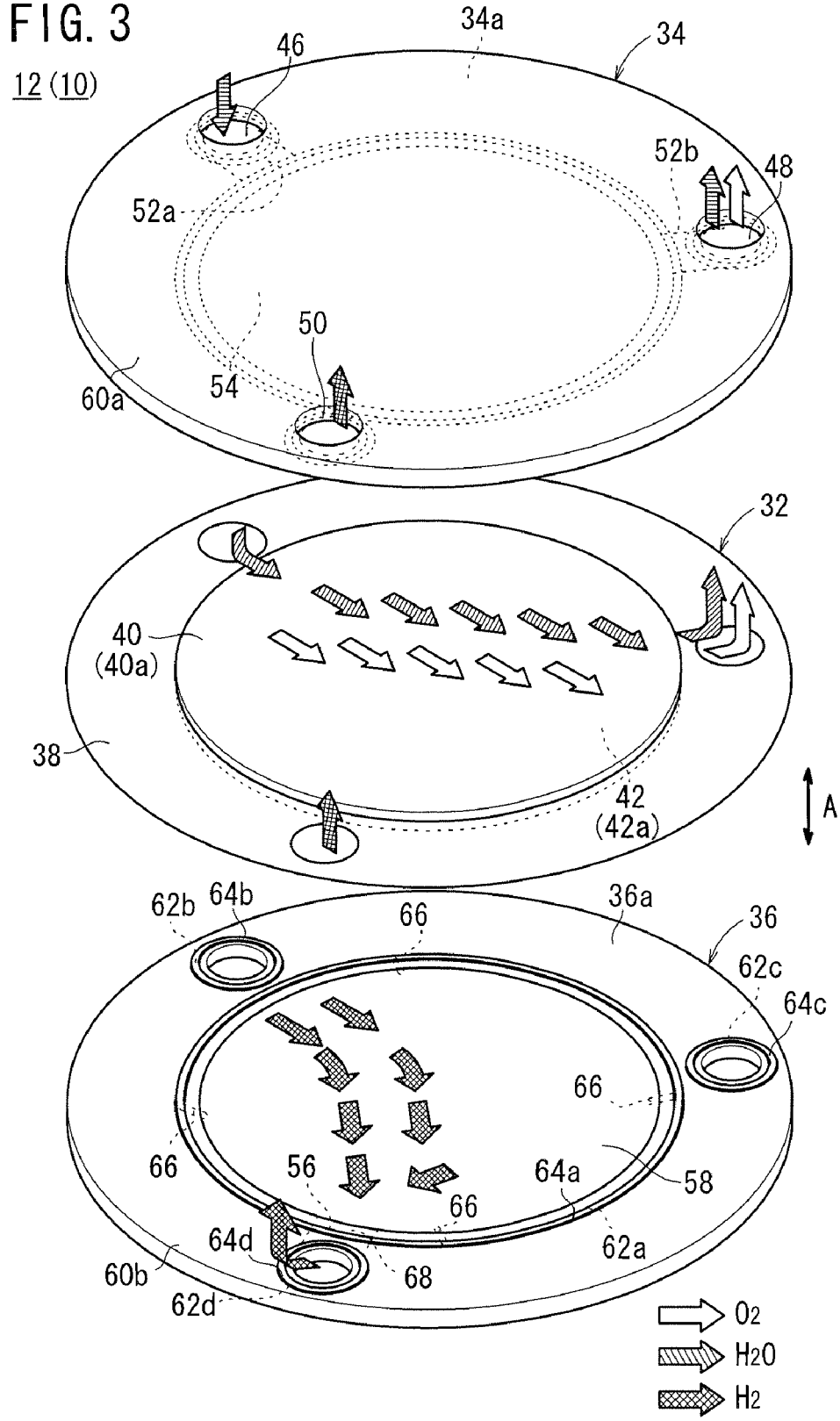
FIG. 3 is an exploded perspective view of a unit cell of the water electrolysis apparatus.

As shown in FIGS. 2 and 3, each of the unit cells 12 comprises a disk-shaped membrane electrode assembly 32, and an anode separator 34 and a cathode separator 36 which sandwich the membrane electrode assembly 32 therebetween. Each of the anode separator 34 and the cathode separator 36 is of a disk shape and is in the form of a carbon plate, or in the form of a metal plate such as a steel plate, a stainless steel plate, a titanium plate, an aluminum plate, or a plated steel plate. Alternatively, each of the separators 34, 36 is formed by performing anti-corrosion treatment on the surface of such a metal plate and thereafter pressing the metal plate into shape, or by cutting the metal plate into shape and thereafter performing anti-corrosion treatment on the surface of the cut metal plate.

The membrane electrode assembly 32 has a solid polymer electrolyte membrane 38 comprising a thin membrane of perfluorosulfonic acid which is impregnated with water, and an anode current collector 40 and a cathode current collector 42 which are disposed respectively on the opposite surfaces of the solid polymer electrolyte membrane 38.

An anode catalyst layer 40a and a cathode catalyst layer 42a are formed on the opposite surfaces of the solid polymer electrolyte membrane 38, respectively. The anode catalyst layer 40a is made of a Ru (ruthenium)-based catalyst, for example, and the cathode catalyst layer 42a is made of a platinum catalyst, for example.

The anode catalyst layer 40a and the cathode catalyst layer 42a are externally supplied with electricity through the anode current collector 40 and the cathode current collector 42, respectively. Each of the anode current collector 40 and the cathode current collector 42 is made of a sintered spherical atomized titanium powder (porous conductive material), and has a smooth surface area which is etched after it is cut to shape. Each of the anode current collector 40 and the cathode current collector 42 has a porosity in the range of 10% to 50%, or more preferably in the range from 20% to 40%.

Each of the unit cells 12 has, in an outer circumferential edge portion thereof, a water supply passage 46 for supplying water (pure water) as a first fluid, a discharge passage 48 for discharging oxygen generated by a reaction in the unit cells 12 and used water, and a hydrogen passage (high-pressure fluid passage) 50 for passing therethrough hydrogen (high-pressure hydrogen) as a second fluid generated by the reaction. The water supply passages 46 defined in the respective unit cells 12 communicate with each other in the stacking directions indicated by the arrow A. The discharge passages 48 defined in the respective unit cells 12 communicate with each other in the stacking directions indicated by the arrow A. The hydrogen passages 50 defined in the respective unit cells 12 communicate with each other in the stacking directions indicated by the arrow A.

Figure 4:
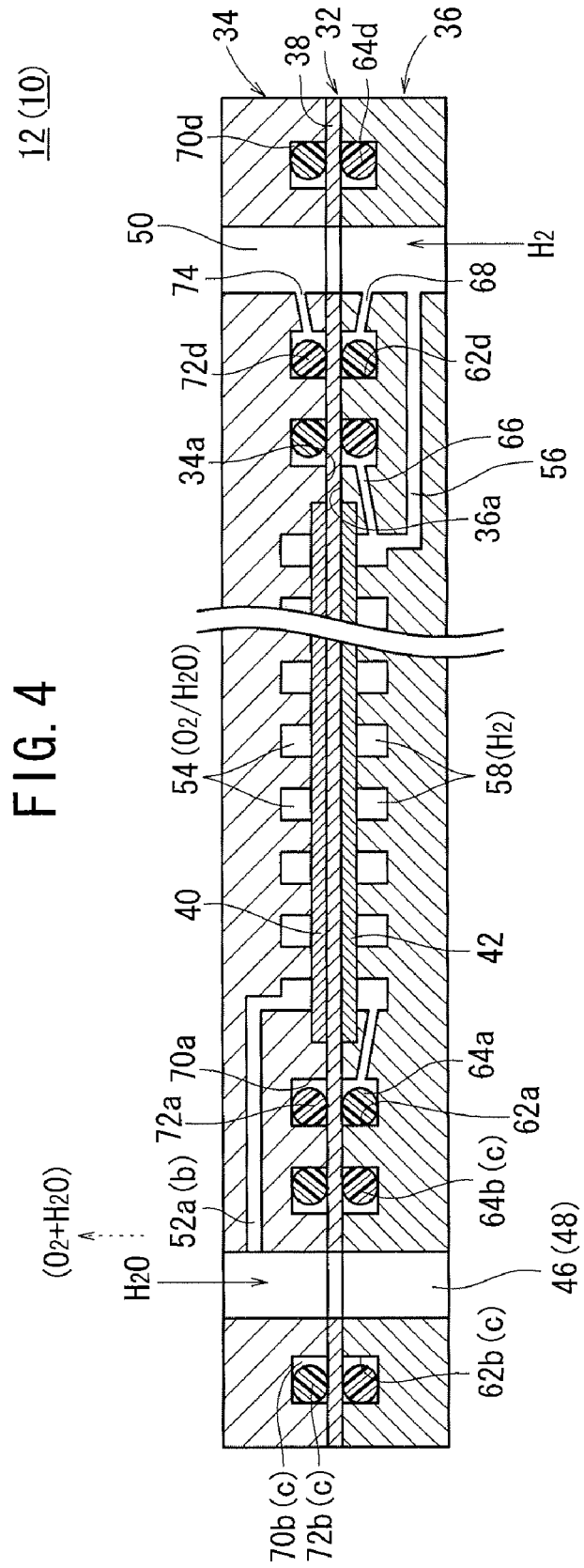
FIG. 4 is a fragmentary cross-sectional view of the unit cell.

As shown in FIGS. 3 and 4, the anode separator 34 has a supply channel 52a defined in an outer circumferential edge portion thereof in fluid communication with the water supply passage 46 and a discharge channel 52b defined in an outer circumferential edge portion thereof in fluid communication with the discharge passage 48. The anode separator 34 also has a first flow field 54 defined in a surface 34a thereof which faces the membrane electrode assembly 32 and held in fluid communication with the supply channel 52a and the discharge channel 52b. The first flow field 54 extends within a range corresponding to the surface area of the anode current collector 40, and comprises a plurality of fluid passage grooves, a plurality of embossed ridges, or the like (see FIGS. 2 and 3).

The cathode separator 36 has a discharge channel 56 defined in an outer circumferential edge portion thereof in fluid communication with the hydrogen passage 50. The cathode separator 36 also has a second flow field 58 defined in a surface 36a thereof which faces the membrane electrode assembly 32 and held in fluid communication with the discharge channel 56. The second flow field 58 extends within a range corresponding to the surface area of the cathode current collector 42, and comprises a plurality of fluid passage grooves, a plurality of embossed ridges, or the like (see FIGS. 2 and 3).

Seal members 60a, 60b are integrally combined with respective outer circumferential edge portions of the anode separator 34 and the cathode separator 36. The seal members 60a, 60b are made of a seal material, a cushion material, or a gasket material such as EPDM, NBR, fluororubber, silicone rubber, fluorosilicone rubber, butyl rubber, natural rubber, styrene rubber, chloroprene, acrylic rubber, or the like. As shown in FIG. 4, the surface 36a of the cathode separator 36 which faces the membrane electrode assembly 32 has a first seal groove 62a defined therein which extends annularly around the second flow field 58.

As shown in FIGS. 3 and 4, the surface 36a of the cathode separator 36 also has a second seal groove 62b, a third seal groove 62c, and a fourth seal groove 62d defined therein which extend annularly around the water supply passage 46, the discharge passage 48, and the hydrogen passage 50, respectively. A first seal member 64a, a second seal member 64b, a third seal member 64c, and a fourth seal member 64d, each in the form of an O-ring, for example, are disposed respectively in the first seal groove 62a, the second seal groove 62b, the third seal groove 62c, and the fourth seal groove 62d.

The second flow field 58 and the first seal groove 62a are held in fluid communication with each other through a plurality of passageways (openings) 66 (for example, four passageways). The passageways 66 are open at an inner wall surface of the first seal groove 62a which is closer to the second flow field 58 than the first seal member 64a. The passageways 66 keep the second flow field 58 and the first seal groove 62a in direct fluid communication with each other in bypassing relation to the boundary between the cathode separator 36 and the solid polymer electrolyte membrane 38.

The hydrogen passage 50, which serves as a high-pressure hydrogen passage, and the fourth seal groove 62d are held in fluid communication with each other through one or more passageways (openings) 68. The passageways 68 are open at an inner wall surface of the fourth seal groove 62d. The passageways 68 keep the hydrogen passage 50 and the fourth seal groove 62d in direct fluid communication with each other in bypassing relation to the boundary between the cathode separator 36 and the solid polymer electrolyte membrane 38.

The surface 34a of the anode separator 34 which faces the membrane electrode assembly 32 has a first seal groove 70a defined therein which extends annularly around the first flow field 54 and which is open toward the first seal groove 62a. The surface 34a of the anode separator 34 also has a second seal groove 70b, a third seal groove 70c, and a fourth seal groove 70d defined therein which extend annularly around the water supply passage 46, the water discharge passage 48, and the hydrogen passage 50, respectively, and which are open toward the second seal groove 62b, the third seal groove 62c, and the fourth seal groove 62d, respectively.

A first seal member 72a, a second seal member 72b, a third seal member 72c, and a fourth seal member 72d, each in the form of an O-ring, for example, are disposed respectively in the first seal groove 70a, the second seal groove 70b, the third seal groove 70c, and the fourth seal groove 70d. The fourth seal groove 70d and the hydrogen passage 50 are held in fluid communication with each other through one or more passageways (openings) 74. The passageways 74 are open at an inner wall surface of the fourth seal groove 70d. The passageways 74 keep the hydrogen passage 50 and the fourth seal groove 70d in direct fluid communication with each other in bypassing relation to the boundary between the anode separator 34 and the solid polymer electrolyte membrane 38.

As shown in FIGS. 1 and 2, pipes 76a, 76b, 76c are connected to the end plate 20a in fluid communication with the water supply passage 46, the discharge passage 48, and the hydrogen passage 50, respectively. A back pressure valve or a solenoid-operated valve, not shown, is connected to the pipe 76c for maintaining the pressure of hydrogen generated in the hydrogen passage 50 at a high pressure level.

Operation of the water electrolysis apparatus 10 will be described below.

As shown in FIG. 1, water is supplied from the pipe 76a to the water supply passage 46 in the water electrolysis apparatus 10, and a voltage is applied between the terminals 24a, 24b of the terminal plates 16a, 16b by the power supply 28. As shown in FIG. 3, in each of the unit cells 12, the water is supplied from the water supply passage 46 into the first flow field 54 of the anode separator 34 and moves in and along the anode current collector 40.

The water is electrolyzed by the anode catalyst layer 40a, generating hydrogen ions, electrons, and oxygen. The hydrogen ions generated by the anodic reaction move through the solid polymer electrolyte membrane 38 to the cathode catalyst layer 42a where they combine with the electrons to produce hydrogen.

The produced hydrogen flows along the second flow field 58 that is defined between the cathode separator 36 and the cathode current collector 42. The hydrogen is kept under a pressure higher than the pressure in the water supply passage 46, and flows through the hydrogen passage 50. Thus, the hydrogen is extracted from the water electrolysis apparatus 10. The oxygen generated by the anodic reaction and the water that has been used flow in the first flow field 54 and then flow through the discharge passage 48 for being discharged from the water electrolysis apparatus 10.

Since the high-pressure hydrogen is generated in the second flow field 58, the second flow field 58 serves as a high-pressure hydrogen generating chamber. Since the second flow field 58 is held in fluid communication with the first seal groove 62a through the passageways 66, the first seal groove 62a is also filled with the high-pressure hydrogen.

The high-pressure hydrogen is also introduced into the hydrogen passage 50 which is held in fluid communication with the second flow field 58. The fourth seal grooves 62d, 70d that are held in fluid communication with the hydrogen passage 50 through the passageways 68, 74 are also pressurized by the high-pressure hydrogen.

When the water electrolysis apparatus 10 is shut down, the second flow field 58 is released from the pressure, i.e., depressurized, in order to eliminate the pressure difference between the first flow field 54 which is kept under normal pressure and the second flow field 58 which is held under a high pressure.

According to the first embodiment, the first seal groove 62a and the second flow field 58 are held in direct fluid communication with each other through the passageways 66, which may be four passageways 66, for example. When the second flow field 58 is released from the pressure, i.e., depressurized, therefore, the first seal groove 62a is also released from the pressure through the passageways 66, which provide fluid communication between the second flow field 58 and the first seal groove 62a.

When the second flow field 58 is released from the pressure, there is no pressure difference developed between the second flow field 58 and the first seal groove 62a, thus preventing the high-pressure hydrogen from moving abruptly from the first seal groove 62a into the second flow field 58 along the solid polymer electrolyte membrane 38 under unwanted increased pressure differences. Consequently, the solid polymer electrolyte membrane 38 that is confronted by the first seal members 64a, 72a is protected against damage.

When the hydrogen passage 50 is released from the pressure, the high-pressure hydrogen in the fourth seal grooves 62d, 70d which are held in direct fluid communication with the hydrogen passage 50 through the passageways 68, 74, respectively, is discharged into the hydrogen passage 50. Therefore, the fourth seal grooves 62d, 70d are not held under the high pressure, thus preventing the high-pressure hydrogen from moving abruptly from the fourth seal grooves 62d, 70d into the hydrogen passage 50 along the solid polymer electrolyte membrane 38. Consequently, the solid polymer electrolyte membrane 38 is also protected against damage as far as possible.

Figure 5:
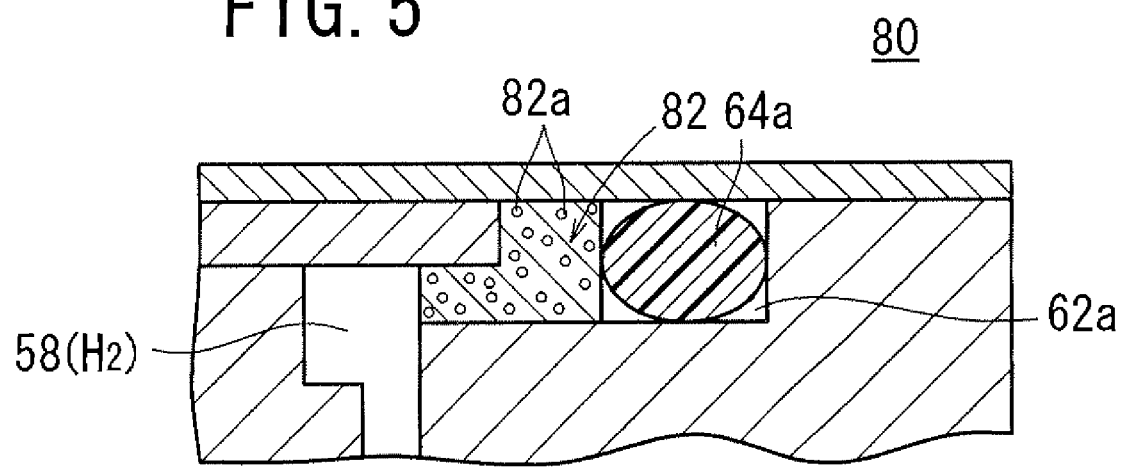
FIG. 5 is a fragmentary cross-sectional view of a cathode separator of a water electrolysis apparatus as an electrochemical apparatus according to a second embodiment of the present invention.

FIG. 5 shows in fragmentary cross section a cathode separator 80 of a water electrolysis apparatus as an electrochemical apparatus according to a second embodiment of the present invention.

Those parts of the cathode separator 80 which are identical to those of the cathode separator 36 of the water electrolysis apparatus 10 according to the first embodiment are denoted by identical reference characters, and will not be described in detail below.

As shown in FIG. 5, the cathode separator 80 includes a porous ring member 82 disposed in the boundary between an outer circumferential portion of the second flow field 58 and the first seal groove 62a extending around the second flow field 58. The porous ring member 82 has a number of pores 82a therein which provide fluid communication between the second flow field 58 and the first seal groove 62a.

According to the second embodiment, when the second flow field 58 is released from the pressure, the high-pressure hydrogen in the first seal groove 62a moves through the pores 82a of the porous ring member 82 into the second flow field 58 smoothly. Consequently, no pressure difference is developed between the second flow field 58 and the first seal groove 62a, so that the solid polymer electrolyte membrane 38 will not be unduly damaged. The second embodiment, therefore, offers the same advantages as the first embodiment.

Instead of the porous ring member 82, a plurality of arcuate porous members may be disposed at given spaced angular intervals between the second flow field 58 and the first seal groove 62a. The porous ring member 82 may be made of sintered powder. The pores 82a may be formed by a mechanical machining process or the like.

Figure 6:
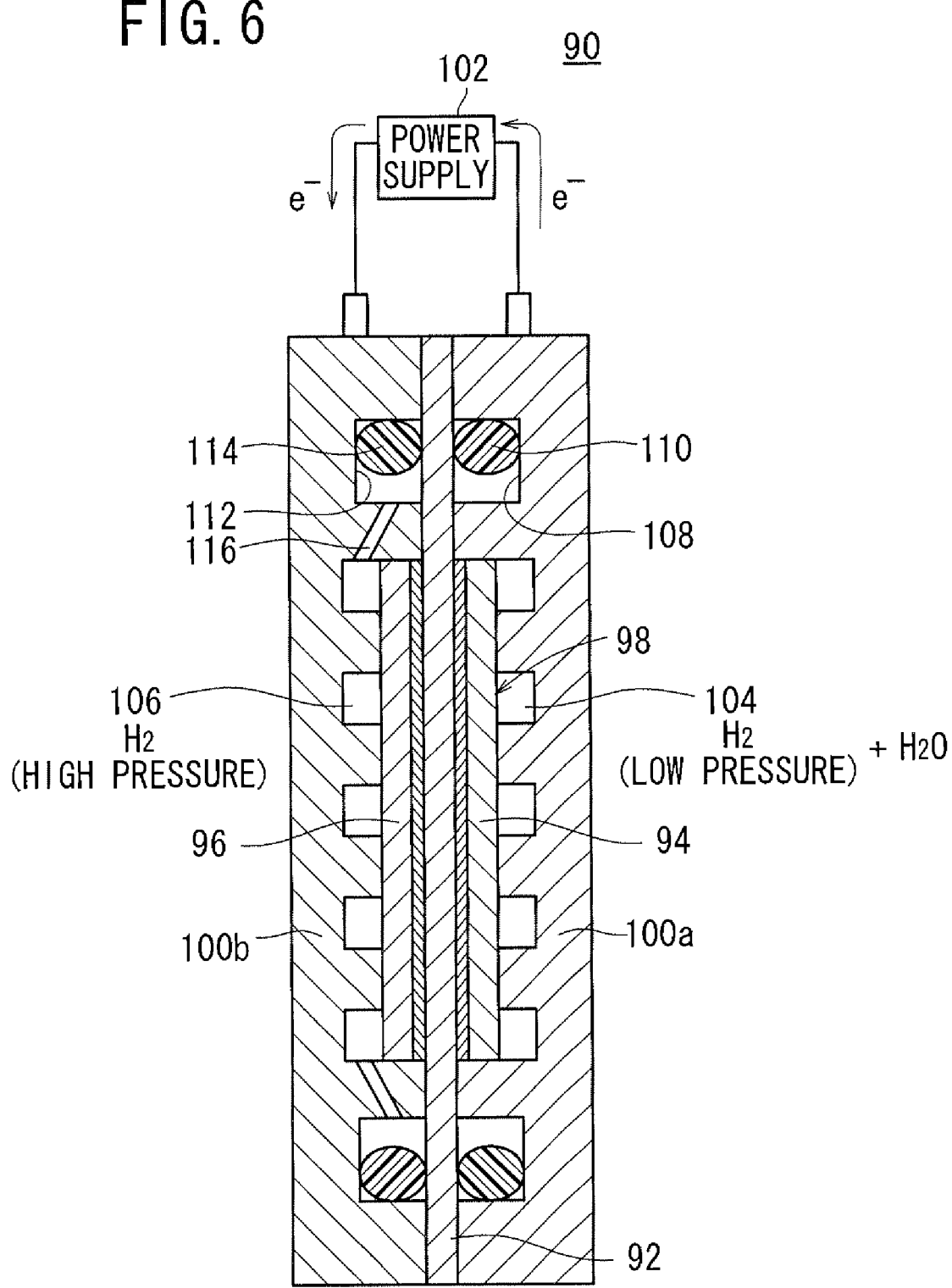
FIG. 6 is a cross-sectional view of a hydrogen pressurizing apparatus as an electrochemical apparatus according to a third embodiment of the present invention.
Figure 7:
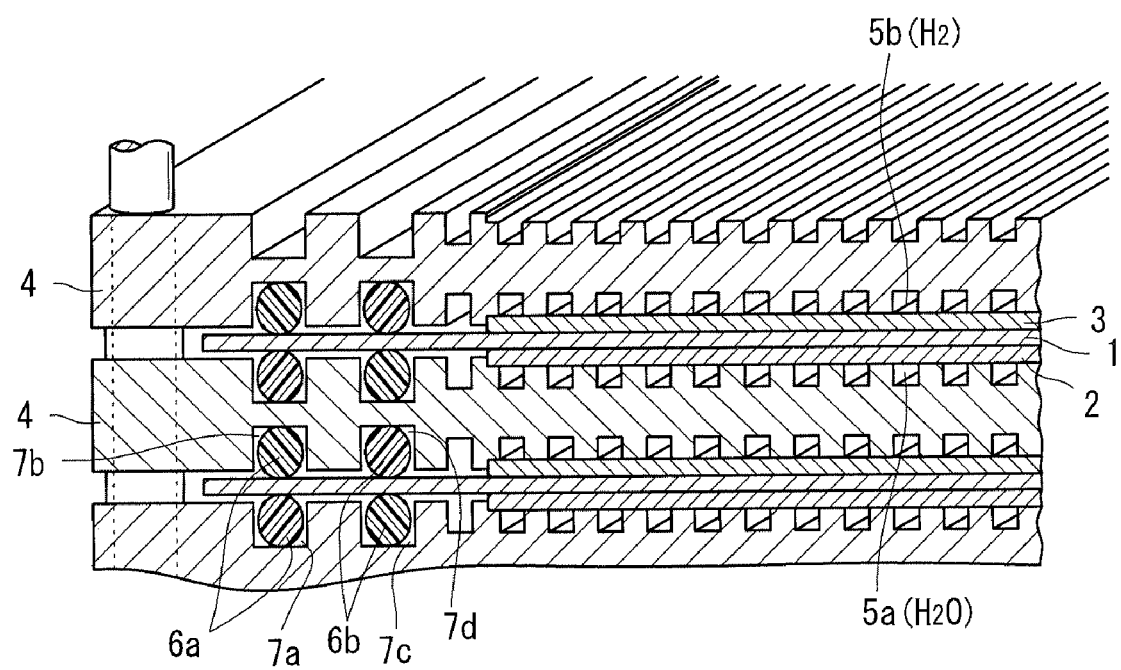
FIG. 7 is a fragmentary cross-sectional view of a water electrolysis apparatus disclosed in Japanese Laid-Open Patent Publication No. 2004-002914.

FIG. 6 shows in cross section a hydrogen pressurizing apparatus 90 as an electrochemical apparatus according to a third embodiment of the present invention.

As shown in FIG. 6, the hydrogen pressurizing apparatus 90 includes a solid polymer electrolyte membrane 92 and a gas diffusion electrode 94 and a gas diffusion electrode (or a gas generation electrode) 96 which are disposed one on each side of the solid polymer electrolyte membrane 92. The solid polymer electrolyte membrane 92 and the gas diffusion electrodes 94, 96 jointly make up a polymer membrane electrode assembly 98.

The polymer membrane electrode assembly 98 is sandwiched between separators 100a, 100b which are electrically connected to a power supply 102. The separator 100a has a first flow field 104 defined therein which is supplied with low-pressure hydrogen and water, and the separator 100b has a second flow field 106 defined therein which is supplied with high-pressure hydrogen.

The separator 100a has a seal groove 108 defined therein which extends annularly around the first flow field 104. A seal member 110 in the form of an O-ring, for example, is disposed in the seal groove 108. The separator 100b has a seal groove 112 defined therein which extends annularly around the second flow field 106. A seal member 114 in the form of an O-ring, for example, is disposed in the seal groove 112.

The second flow field 106 and the seal groove 112 are held in fluid communication with each other by a plurality of passageways 116. The passageways 116 keep the second flow field 106 and the seal groove 112 in direct fluid communication with each other in bypassing relation to the boundary between the separator 100b and the solid polymer electrolyte membrane 92.

When the first flow field 104 is supplied with low-pressure wet hydrogen, the hydrogen is diffused into the gas diffusion electrode 94 and dissociated into protons and electrons.

When the power supply 102 applies a voltage between the separators 100a, 100b, the electrons pass through an external circuit connected to the hydrogen pressurizing apparatus 90, and the protons are diffused through solid polymer electrolyte membrane 92 and combined with the electrons in the gas diffusion electrode 96, generating hydrogen. Thus, the second flow field 106 generates high-pressure hydrogen under the voltage applied from the power supply 102.

According to the third embodiment, the second flow field 106 where the high-pressure hydrogen is generated and the seal groove 112 are held in direct fluid communication with each other through the passageways 116. When the second flow field 106 is released from the pressure, therefore, the seal groove 112 is also released from the pressure smoothly. Consequently, no pressure difference is developed between the second flow field 106 and the seal groove 112, so that the solid polymer electrolyte membrane 92 will not be unduly damaged. The third embodiment, therefore, offers the same advantages as the first and second embodiments.

Although certain preferred embodiments of the present invention have been shown and described in detail, it should be understood that various changes and modifications may be made therein without departing from the scope of the appended claims.

What is claimed is:

1. An electrochemical apparatus, for producing, through electrolysis, a first fluid having a normal pressure and a second fluid having a pressure higher than the normal pressure, comprising:

an electrolyte membrane;

a pair of current collectors disposed respectively on opposite sides of the electrolyte membrane; and a pair of separators stacked respectively on the current collectors;

wherein a first flow field for supplying the first fluid having the normal pressure is defined between one of the current collectors and one of the separators, and a second flow field for producing the second fluid having the pressure higher than normal pressure is defined between the other current collector and the other separator;

the one of the separators includes a first seal groove defined therein which extends around the first flow field, a seal member disposed in the first seal groove, and the other separator includes a second seal groove defined therein which extends around the second flow field, a second seal member disposed in the second seal groove, only the second seal groove including an opening which provides fluid communication between the second flow field and the second seal groove, no opening for fluid communication being provided between the first flow field and the first seal groove, wherein the first and second seal members are disposed in confronting relation to the electrolyte membrane interposed between the separators, and the first and second seal members are of a solid material.

2. An electrochemical apparatus according to claim 1, wherein the first fluid comprises water and the second fluid comprises hydrogen.

3. An electrochemical apparatus according to claim 1, wherein the opening comprises a porous ring member disposed in a boundary between an outer circumferential portion of the second flow field and the second seal groove which extends around the second flow field.

4. An electrochemical apparatus for producing, through electrolysis, a first fluid having a normal pressure and a second fluid having a pressure higher than the normal pressure, comprising:

an electrolyte membrane;

a pair of current collectors disposed respectively on opposite sides of the electrolyte membrane;

a pair of separators stacked respectively on the current collectors;

a first flow field for supplying the first fluid having the normal pressure, the first flow field being defined between one of the current collectors and one of the separators;

a second flow field for producing the second fluid having the pressure higher than normal pressure, the second flow field being defined between the other current collector and the other separator;

a water supply passage held in fluid communication with the first flow field, the water supply passage extending therethrough along a direction in which the separators are stacked; and a discharge passage held in fluid communication with the first flow field, the discharge passage extending therethrough along a direction in which the separators are stacked, and wherein the separators each include:

a first seal groove extending around the water supply passage, a first seal member being disposed therein, a second seal groove extending around the discharge passage, a second seal member being disposed therein, a third seal groove extending around a high-pressure fluid passage, a third seal member being disposed therein, and wherein the first, second and third seal members are disposed in confronting relation to the electrolyte membrane interposed between the separators, the seal members are of a solid material, and only the third seal groove extending around the high-pressure fluid passage includes an opening for providing fluid communication with the high-pressure fluid passage.

5. An electrochemical apparatus according to claim 4, wherein the first fluid comprises water, the second fluid comprises hydrogen, and the high-pressure fluid passage comprises a high-pressure hydrogen passage.

* * * * *